US012772939B2

(12) United States Patent
LaRue et al.

(10) Patent No.: US 12,772,939 B2
(45) Date of Patent: Oct. 27, 2026

(54) NON-INTERCONNECTED GROWTH SYSTEM

(71) Applicant: Hippo Harvest Inc., San Francisco, CA (US)

(72) Inventors: Therese LaRue, Redwood City, CA (US); Chelsea Wirth, Ann Arbor, MI (US); Eitan Marder-Eppstein, San Francisco, CA (US); Wim Meeussen, Redwood City, CA (US)

(73) Assignee: Hippo Harvest Inc., San Francisco, CA (US)

(*) Notice: Subject to any disclaimer, the term of this patent is extended or adjusted under 35 U.S.C. 154(b) by 0 days.

(21) Appl. No.: 18/297,116

(22) Filed: Apr. 7, 2023

(65) Prior Publication Data

US 2023/0320296 A1 Oct. 12, 2023

Related U.S. Application Data

(60) Provisional application No. 63/362,734, filed on Apr. 8, 2022.

(51) Int. Cl.
*A01G 31/02* (2006.01)

(52) U.S. Cl.
CPC .................................... *A01G 31/02* (2013.01)

(58) Field of Classification Search
CPC ...................................................... A01G 31/02
See application file for complete search history.

(56) References Cited

U.S. PATENT DOCUMENTS

| | | | | | |
|---|---|---|---|---|---|
| 4,324,069 | A * | 4/1982 | Flagg | A01G 27/001 | 47/62 E |
| 5,184,420 | A * | 2/1993 | Papadopoulos | A01G 31/00 | 47/62 N |
| 7,823,328 | B2 * | 11/2010 | Walhovd | A01G 31/02 | 47/62 A |
| 8,028,470 | B2 * | 10/2011 | Anderson | A01G 25/09 | 47/79 |
| 9,491,913 | B2 * | 11/2016 | Mayer | A01G 25/167 | |
| 10,999,985 | B2 * | 5/2021 | Watson | A01G 31/06 | |
| 11,324,171 | B2 * | 5/2022 | Hsueh | A01G 27/003 | |
| 11,730,089 | B2 * | 8/2023 | King | A01G 9/14 | 47/17 |
| 11,991,962 | B2 * | 5/2024 | Chandrakanthan | A01G 31/02 | |

(Continued)

FOREIGN PATENT DOCUMENTS

| | | | | | |
|---|---|---|---|---|---|
| CN | 110115146 | A | * | 8/2019 | |
| JP | 2005087042 | A | * | 4/2005 | A01G 31/042 |

(Continued)

*Primary Examiner* — Joshua D Huson
*Assistant Examiner* — Katherine Anne Kloecker

(57) ABSTRACT

A non-interconnected growth system. The system includes a plurality of plant growth units. Each plant growth unit in the plurality of plant growth units is water and nutrient isolated from any other plant growth unit. The system also includes a dynamic nutrient manager configured to collect data from the one or more plant growth units and calculate a customized nutrient plan for each plant growth unit based on the collected data. The system also includes a central fertilizing system configured to receive the nutrient plan for each plant growth unit and deliver nutrients to each plant growth unit based on their respective nutrient plan.

14 Claims, 12 Drawing Sheets

(56) References Cited

U.S. PATENT DOCUMENTS

| | | | | |
|---|---|---|---|---|
| 12,048,276 | B2 * | 7/2024 | Marder-Eppstein | A01G 7/045 |
| 2014/0144078 | A1 * | 5/2014 | Gonyer | A01G 31/02<br>47/62 A |
| 2016/0235025 | A1 * | 8/2016 | Bray | A01G 31/06 |
| 2019/0191639 | A1 * | 6/2019 | Hegyi | A01G 9/20 |
| 2020/0267892 | A1 * | 8/2020 | Heinrich | A01C 21/005 |
| 2021/0204490 | A1 * | 7/2021 | Bartrom | A01G 9/042 |
| 2022/0143847 | A1 * | 5/2022 | Bidram | B25J 19/0025 |
| 2023/0301228 | A1 * | 9/2023 | Weimer | A01C 23/007 |
| 2024/0008425 | A1 * | 1/2024 | Kalouche | A01G 9/143 |

FOREIGN PATENT DOCUMENTS

| | | | | | |
|---|---|---|---|---|---|
| KR | 20180020568 | A | * | 2/2018 | |
| KR | 20180060283 | A | * | 6/2018 | B25J 11/008 |
| WO | WO-2014102553 | A1 | * | 7/2014 | A01G 31/00 |

* cited by examiner

-- PRIOR ART--

NON-INTERCONNECTED GROWTH SYSTEM

CROSS-REFERENCE TO RELATED APPLICATIONS

This application claims priority to Provisional U.S. Patent Application No. 63/362,734, titled "NON-INTERCONNECTED GROWTH SYSTEM," filed on Apr. 8, 2022, by Therese LaRue et al., which is incorporated herein by reference in its entirety and for all purposes.

TECHNICAL FIELD

The present disclosure relates generally to agriculture, and more specifically to grow space systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen; too little and the plant will lose the ability to transport nutrients, which are typically moved into the roots while in solution.

Two of the most common errors when growing are overwatering and underwatering. With the introduction of hydroponics, the two most common errors are eliminated. Hydroponics prevents underwatering from occurring by making large amounts of water available to the plant. Hydroponics prevents overwatering by draining away, recirculating, or actively aerating any unused water, thus, eliminating anoxic conditions.

Current hydroponic growth methods have many problems and are limited in their ability to scale on data collection and production fronts. For example, current hydroponic systems are interconnected and share the same water supply. This can lead to spreading of water-borne diseases. In addition, staggered planting or microclimates can cause plants connected to the same water source to be at different stages of growth, which prevents providing optimal nutrition to each plant. Thus, there is a need for a non-interconnected system of growing plants to address the problems stated above.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to a growth system and growspace. The system and growspace comprise a plurality of plant growth units. Each plant growth unit in the plurality of plant growth units is water and nutrient isolated from any other plant growth unit. The system also includes a dynamic nutrient manager configured to collect data from the one or more plant growth units and calculate a customized nutrient plan for each plant growth unit based on the collected data. The system also includes a central fertilizing system configured to receive the nutrient plan for each plant growth unit and deliver nutrients to each plant growth unit based on their respective nutrient plan.

In some embodiments, the fertilizing system uses a unidirectional plumbing mechanism. In some embodiments, the unidirectional plumbing mechanism includes a mobile robot delivery mechanism. In some embodiments, the unidirectional plumbing mechanism includes a fertigation line. In some embodiments, delivering nutrients includes a mobile robot mixing mechanism. In some embodiments, delivering nutrients includes a multi-side delivery mechanism. In some embodiments, each plant growth unit is configured such that plants within the plant growth unit can be respaced during a growth cycle. In some embodiments, the dynamic nutrient manager is configured to take multiple different numbers and combinations of triggers for calculating a customized nutrient plan, the triggers including: plant age, plant variety, plant area, plant height, evapotranspiration prediction, vapor pressure deficit, temperature, light, leaf tissue, and water analysis. In some embodiments, at least one plant growth unit in the plurality of plant growth units includes an accordion holder. In some embodiments, the central fertilizing system is further configured to deliver nutrient water dynamically in order to perform root zone control.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular hydroponic grow systems. However, it should be noted that the techniques of the present disclosure apply to a wide variety of different grow systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a growing tray in a variety of contexts. However, it will be appreciated that a system can use multiple growing trays while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, plant roots may be connected to nutrient water, but it will be appreciated that a variety of layers, such as grow mediums and buffer mats, may reside between the plant roots and nutrient water. Consequently, a connection does not necessarily mean a direct, unimpeded connection unless otherwise noted.

EXAMPLE EMBODIMENTS

Current Industry Methods

Figure 1:
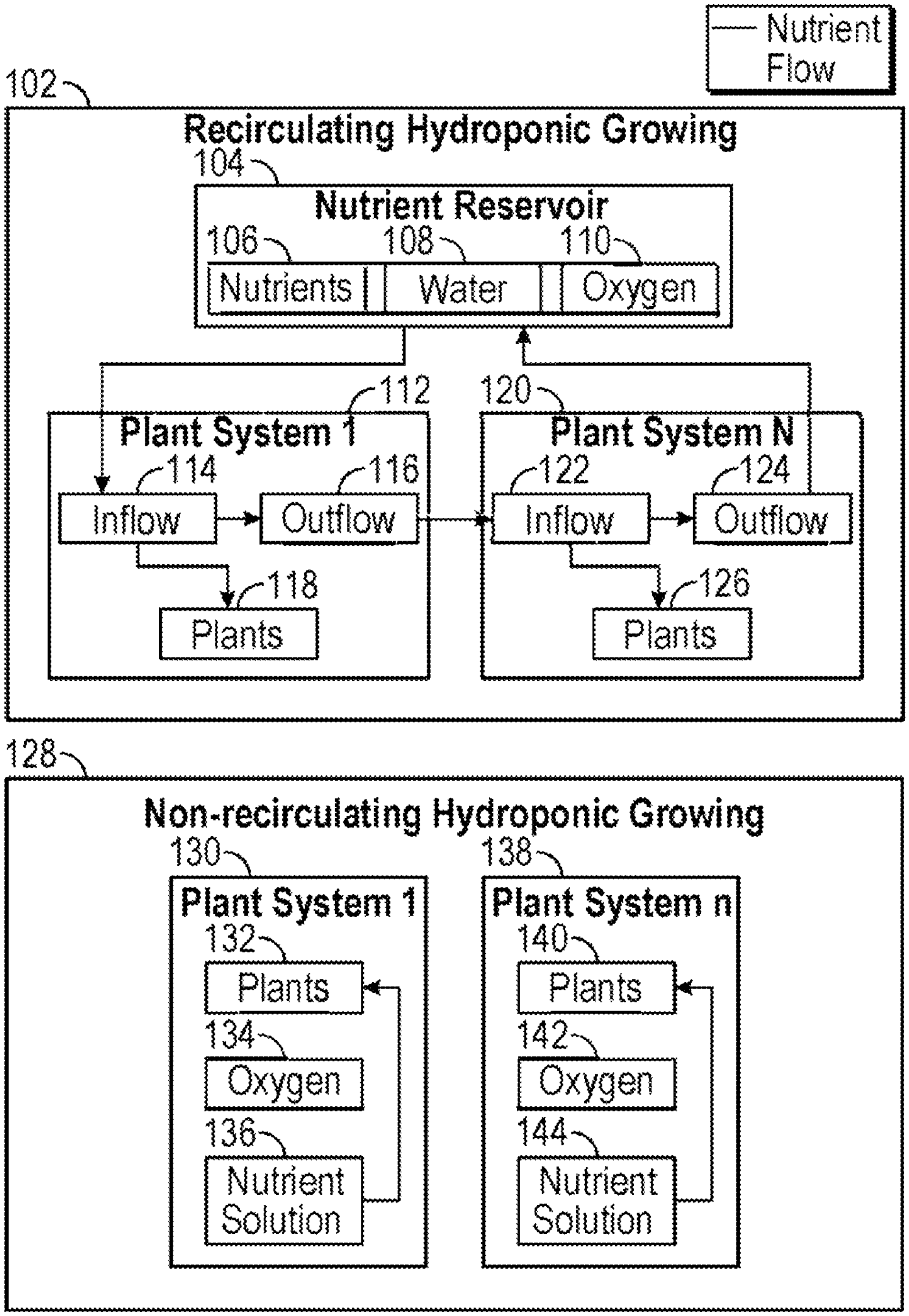
FIG. 1 illustrates example of current hydroponic grow methods, in accordance with one or more embodiments of the present disclosure.

FIG. 1 describes current hydroponic growth methods. In FIG. 1, solid arrows indicate the flow of nutrient water. In recirculating hydroponic growing system 102, a central nutrient reservoir 104 combines nutrients 106 and water 108, which is delivered to the first plant system 112. The nutrient water goes through the inflow 114, and is taken up by plants 118, then flows out through outflow 116. The nutrient water then goes onto subsequent plant systems until it flows through the n-th plant system 120 having inflow 122, outflow 124, and plants 126, at which point it is delivered back to the central nutrient reservoir 104. Once back in nutrient reservoir 104, the nutrient water can either be immediately circulated again or supplemented with additional nutrients 106 and water 108 and then circulated again. The nutrient water gets oxygenated as it flows through the plant systems 112 and 120 and can receive supplemental oxygen 110 in the nutrient reservoir.

In non-recirculating hydroponic growing system 128, there are many separate plant systems 130 and 138. Each plant system 130 and 138 has its own pre-dosed nutrient solution 136 and 144 composed of all water and nutrients the plants will need for the duration of their life cycle. As the plants 132 and 140 use the nutrient solutions 136 and 144, the amount of oxygen 134 and 142 for the plants increases. Nutrient solution 136 and 144 can be swapped out and refreshed at the end of a growth cycle.

These hydroponic growth methods are limited in their ability to scale on data collection and production fronts. Optimization of plant growth can be accelerated with experimentation and data collection. The interconnected nature of recirculating hydroponic growth methods 102 means that all plants share a water supply 104 and data can only be as independent as the number of circulating systems or nutrient managers. With multiple plant systems 112 and 120 connected to a single reservoir 104, all of the plants 118 and 126 interact with each other via the shared water. The nutrients 106 can only be dialed in at the reservoir 104 level, which can lead to suboptimal nutrient conditions in plant systems. Staggered planting or microclimates can cause plants connected to the same reservoir to be at different stages of growth, making it impossible to give all plants the optimal nutrition. Even if all plants are at the same stage of growth, uneven nutrition can become a problem when plants closest to the reservoir take up nutrients before the solution reaches downstream plants. Further, the inherent reuse of water means that microbial communities, both beneficial and harmful, in one plant system spread to the other plant systems. The microbial communities are difficult to control and can change over time. With so many growth parameters influencing one another, it can be difficult to replicate the exact growth conditions needed to ensure reliable and consistent yields. These microbial communities are also often the source of water-borne diseases that spread rapidly through current systems and negatively impact production. Furthermore, recovering from such an outbreak often requires draining and thorough cleaning of all plumbing which is costly, time consuming, and sometimes impossible in the case reliable production must be maintained.

Current non-recirculating methods of hydroponic growing 128 overcome the issue of shared water, but still present challenges in nutrient management and scaling. For a non-circulating system, all of the water and nutrients 136 and 144 needed for a plant's life are provided at the start of growth. This large volume of water makes automation very cumbersome and not suitable for large-scale production. The nutrients provided are difficult to manage and modify as plants grow, often providing suboptimal nutrition for each stage of plant growth. For these reasons, non-recirculating methods are far less common in commercial production.

Solution

Figure 2:
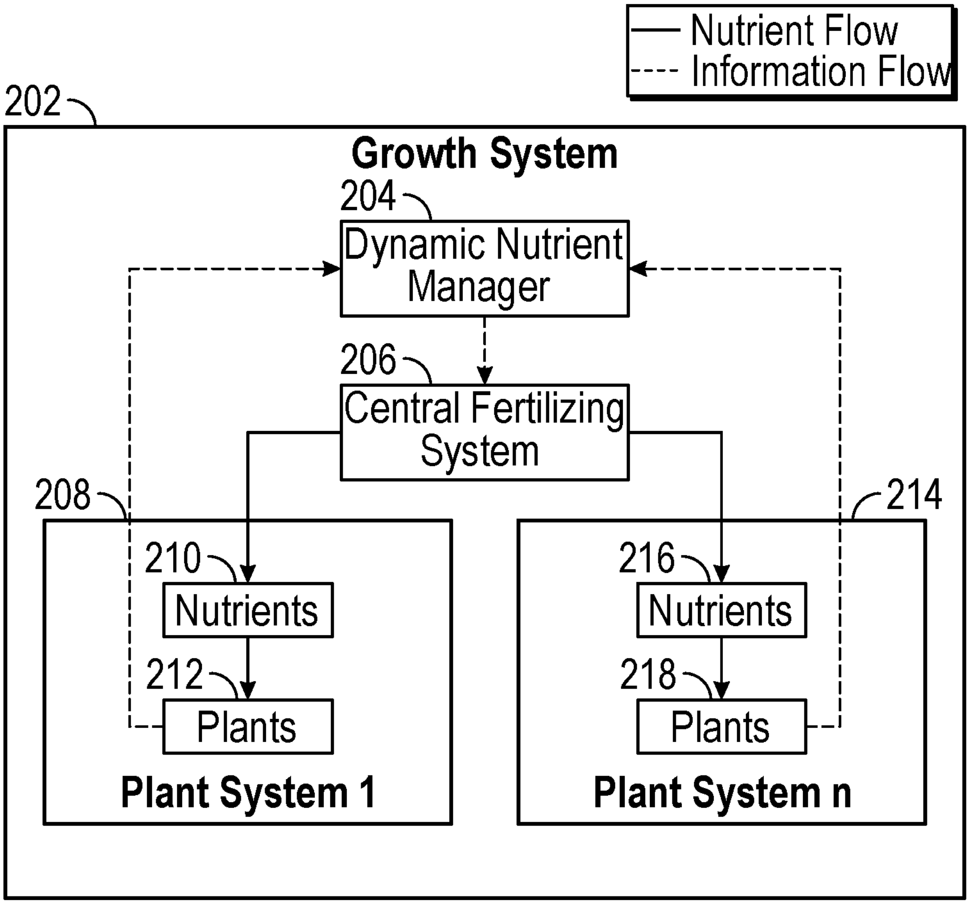
FIG. 2 illustrates a growth system, in accordance with one or more embodiments of the present disclosure.

FIG. 2 describes a growth system 202 that enables plant growth in a non-interconnected manner making it possible to collect high resolution independent data at a production level scale. The hydroponic growth system 202 described here consists of a dynamic nutrient manager 204, central fertilizing system 206, and individual plant systems 208 and 214. By decoupling global nutrient management and plant growth nutrients, it is possible to prevent plant interactions and customize optimal plant growth nutrients for each individual plant system. Dynamic nutrient manager 204 creates a nutrient blend for the plant systems which is mixed by fertilizing system 206. The nutrient rich water is then distributed to plant systems 208 and 214, which are isolated from each other. These independent growth systems prevent microbial spread, eliminate data interconnectedness, and allow nutrition to be delivered optimally, by changing the nutrient mixtures based on genetics or stage-of-life of a given plant. As plants 212 and 218 consume nutrients 210 and 216, dynamic nutrient manager 204 takes in information about the plants, such as plant type and age, to adapt the nutrient blend to be mixed by fertilizing system 206.

Nutrient Customization

The system presented in FIG. 2 addresses the problem of suboptimal nutrients for plants. Providing optimal nutrition for all plants at all stages of growth has not been possible with traditional methods of growing. In recirculating hydroponic systems 102, the same nutrient mix is being delivered to all plant systems. While there is an opportunity to replenish nutrients within the central nutrient reservoir 104, only one nutrient composition can be set for all systems connected to that reservoir and uneven uptake between systems can be problematic.

Figure 3:
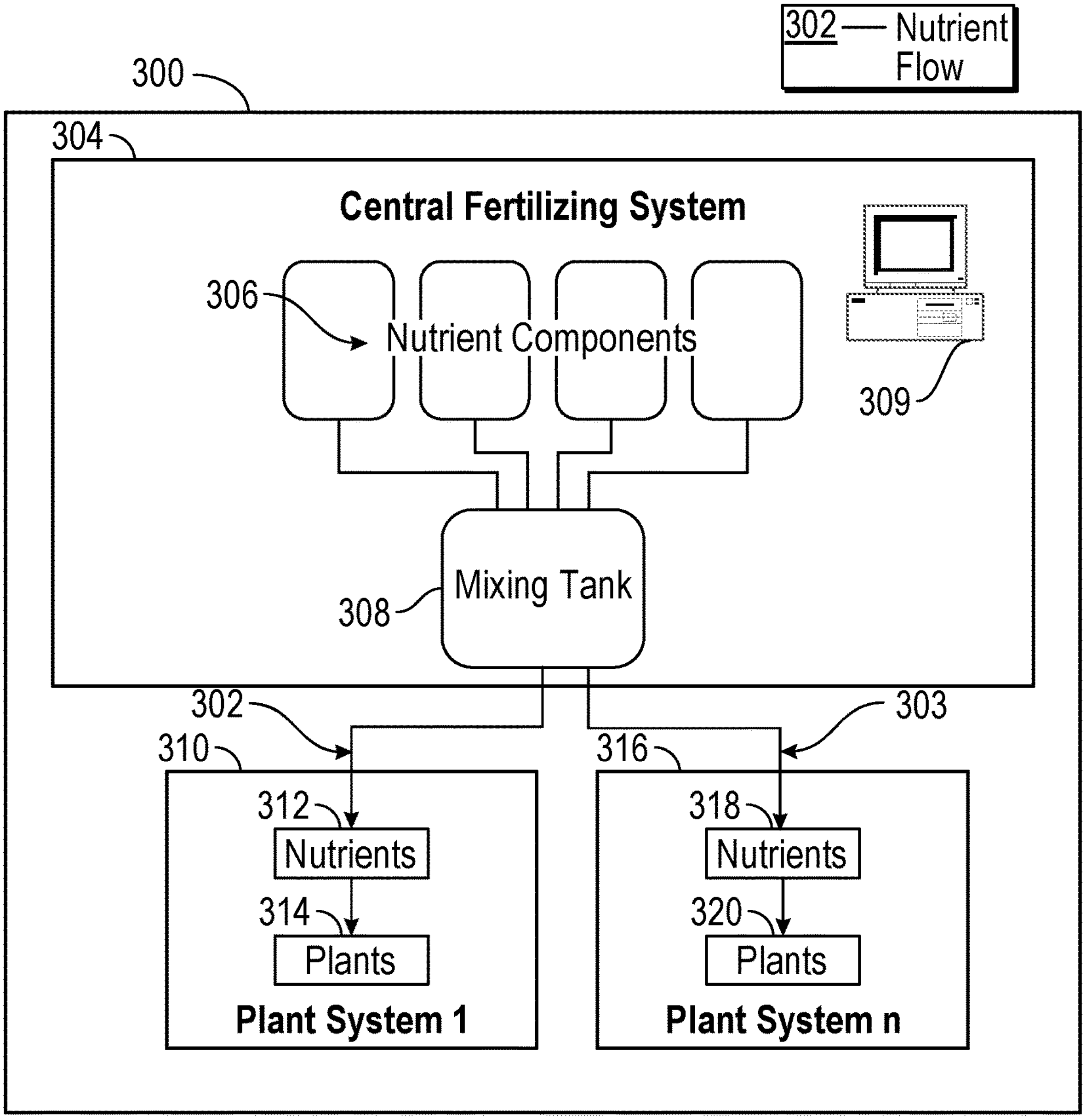
FIG. 3 illustrates a growth system with nutrient customization, in accordance with one or more embodiments of the present disclosure.

FIG. 3 illustrates an example growth system with nutrient customization. Growth system 300 allows each plant system 310 and 316 to receive its own supply of nutrients 312 and 318. When nutrients are being delivered to a plant system, a computer 309 in central fertilizing system 304 adds the desired amounts of each of the nutrient components 306 to central mixing tank 308 to blend the customized nutrient solution 302. The solution is then delivered to the specified plant system 310, without having any of the other plant systems 316 affected. Thus, plant system 316 does not receive customized nutrient solution 302. Instead, plant system 316 receives its own customized nutrient solution 303. This individualization overcomes issues with suboptimal nutrient water composition, interconnected water supply, and microbial spread. Here, any number of plant systems 310 and 316 with plants of different ages can all utilize the same central fertilizing system 304. Since customized nutrients are being delivered to each plant system separately, every plant receives optimal nutrition.

One-Way Flow Plumbing

Figure 4:
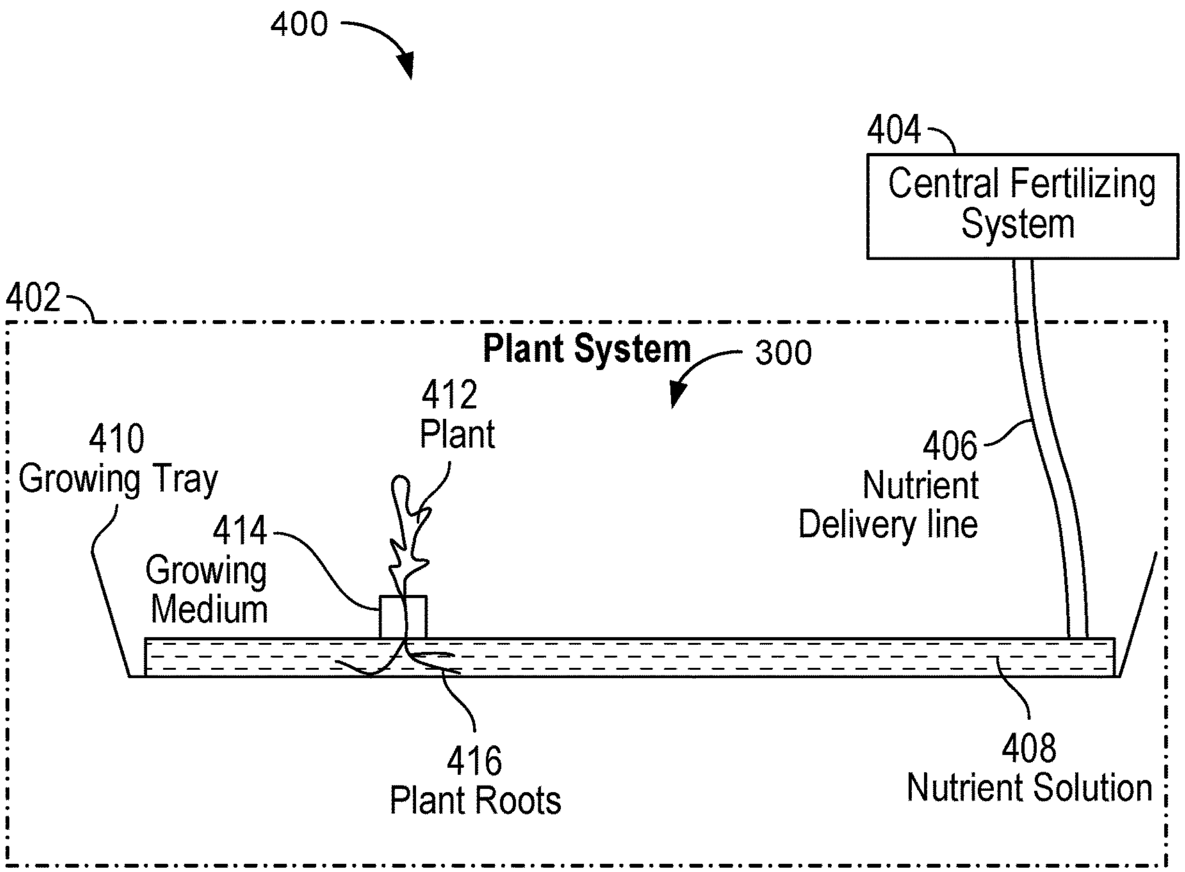
FIG. 4 illustrates a growth system with one-way flow plumbing, in accordance with one or more embodiments of the present disclosure.

According to various embodiments, recirculating hydroponic systems 102 present challenges in even nutrient distribution and interconnected data. Current non-recirculating hydroponic systems 128 overcome these issues, but require large volumes of fertilizing solution. These large volumes create two problems: 1) incompatibility with transportation and automation and 2) inability to modify plant nutrition. FIG. 4 illustrates an example growth system with one-way flow plumbing. Growth system 400 addresses the problems presented above by frequently supplying fresh nutrient solution 408 to each plant system 402. Each plant 412 sits in a growing medium 414 and absorbs nutrients through plant roots 416. In growth system 400, each plant system 402 is connected to a central fertilizing system 404 via a nutrient delivery line 406. These separate delivery lines ensure each plant system 402 is independent from one another, thus preventing interactions and reducing the unit size for experimentation down to the plant system level. Since each plant system has a direct connection to the central fertilizing system 404, small volumes of nutrients can be delivered rather than one large volume intended to last the duration of the plant's life. The water level maintained in an individual plant system can be small enough to make plant system transportation and automation feasible even with hardware that supports only modest payloads. Having each plant system independently connected to the central fertilizing system 404 not only eliminates the need for large volumes of water, it also allows for a higher level of nutrient control than traditional hydroponic systems. As plants grow, additional nutrient solution 408 is delivered to the growing tray 410 of each plant system 402 via the nutrient delivery line 406. These frequent deliveries of fresh nutrient solution means that nutrients can be optimized for each plant system based on the type and age of the plant. In summary, the small-volume one-way flow makes transportation feasible, enables high nutrient control, and keeps data independent by eliminating plant system interactions.

Robotic Nutrient Delivery

Figure 5:
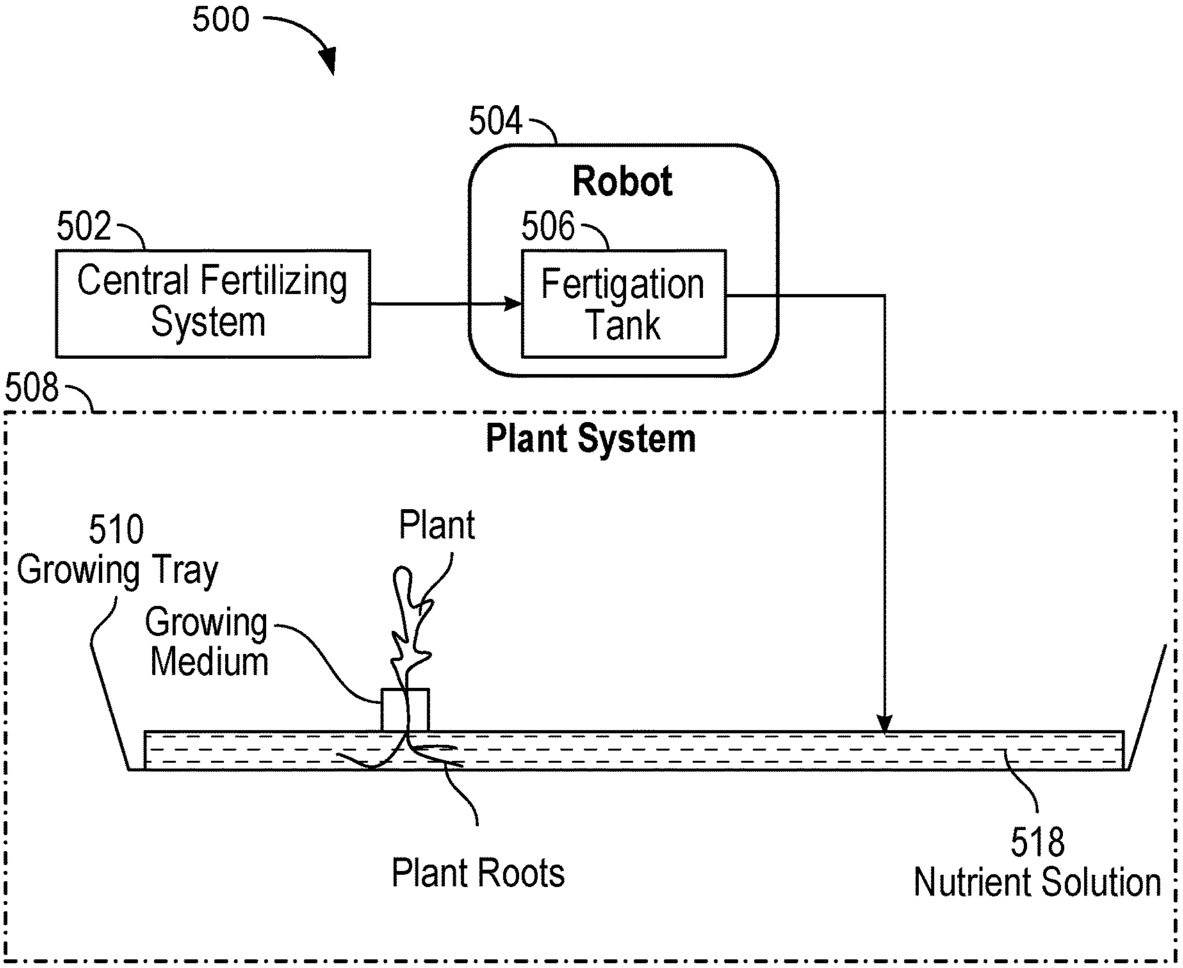
FIG. 5 illustrates a growth system with robotic nutrient delivery, in accordance with one or more embodiments of the present disclosure.

According to various embodiments, frequent nutrient delivery is challenging. A high level of complexity is required to deliver nutrient water to each module via plumbing systems, involving long runs of irrigation lines, intricate valves for routing nutrient solution, and large pumps. The elaborate plumbing set-up creates a single point of failure for nutrient delivery if any part breaks. Manual delivery of nutrient solution is prohibitively labor intensive. The embodiment in FIG. 5 below solves these problems by employing a robotic nutrient delivery technique. Rather than using routing nutrient delivery lines 406 to each plant system, system 500 utilizes a robot 504 with one or more fertigation tanks 506 to receive water from a central fertilizing system 502, navigate to a plant system 508, and pump nutrient water 518 into grow tray 510. Such embodiments remove the need for plumbing, and is as-flexible as manual delivery of nutrients, but eliminates the cost and inefficiency of manual labor. The implementation of robotic delivery between the fertilizing system and the modules maintains the ability to create custom nutrient mixes while eliminating the need for complex valves and routing systems. Robotic delivery of nutrients enables frequent low-volume deliveries not otherwise possible. Since nutrients are mixed fresh for each delivery, it is easy to customize nutrients for each plant system 508. Finally, robotic delivery eliminates a potential point of weakness and increased maintenance costs caused by complex plumbing. Many robots 504 and fertilizing systems 502 could be deployed within a grow area, thus creating redundancy if one robot or a central fertilizing system goes down.

Adaptive Nutrient Management

Figure 6:
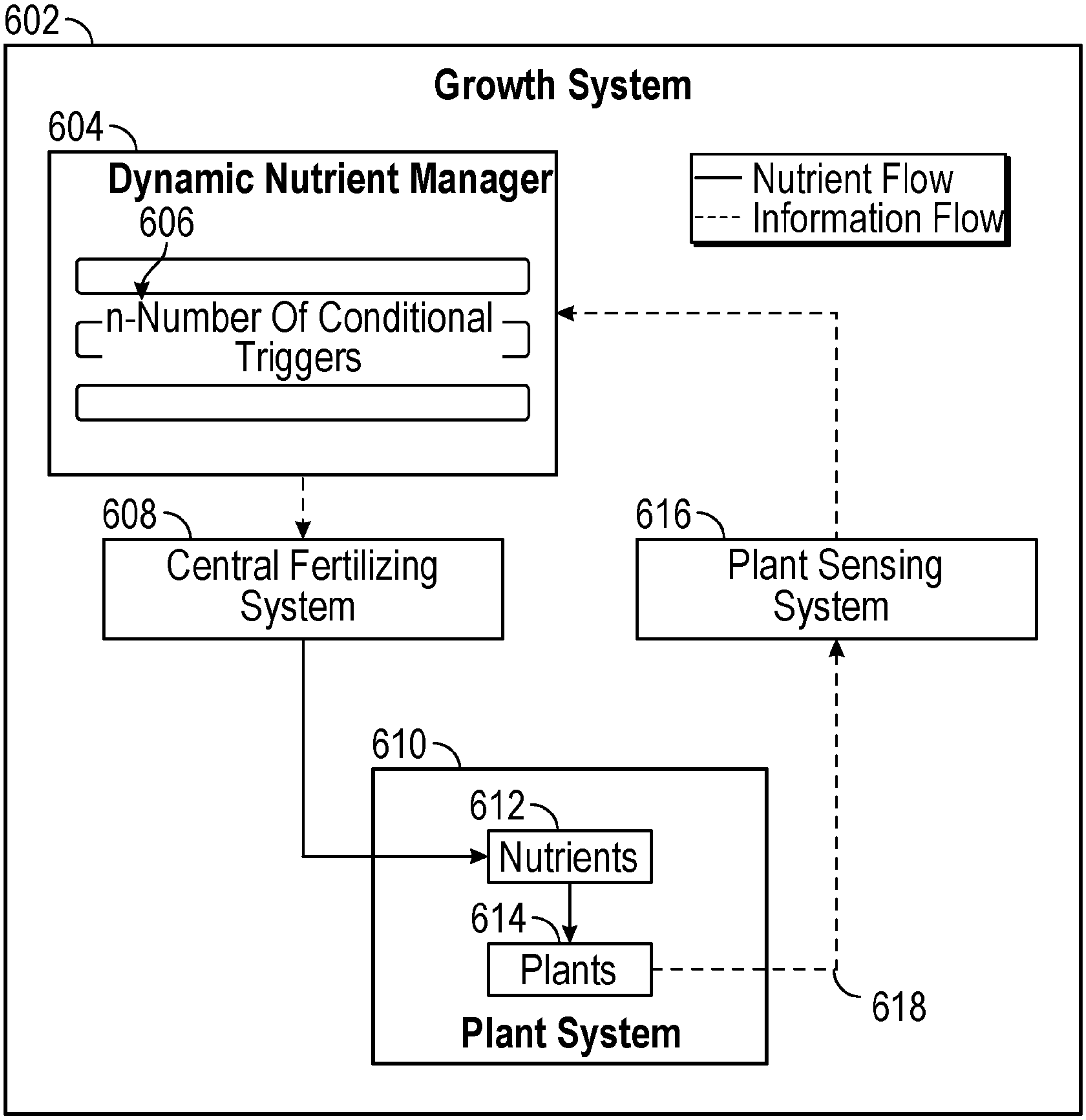
FIG. 6 illustrates a growth system with adaptive nutrient management, in accordance with one or more embodiments of the present disclosure.

FIG. 6 illustrates a growth system with adaptive nutrient management. The example presented in FIG. 6 enables growth system modifications in response to unexpected growth dynamics. All growing locations have complex environmental parameters that influence plant growth, such as light, temperature, and airflow. Despite best efforts to make growing environments uniform, microclimates often exist, which create slightly uneven growth. Plants may be ahead of or behind the anticipated growth trajectory, causing them to become out of sync with a pre-set nutrient profile. To address this problem, a centralized dynamic nutrient manager 604 can use a multitude of conditional triggers 606 (n-number of triggers) to adjust the nutrient profile for each individual plant system 610 within growth system 602. Central fertilizing system 608 receives the nutrient profile and delivers customized nutrients 612 to plants 614 in each plant system 610. Adjustments can be made based on collected data 618, which can include plant data (e.g. plant age, plant variety, area, and height), environmental data (e.g. evapotranspiration prediction, vapor pressure deficit, temperature, and light), and even direct samples (e.g. leaf tissue or water analysis). Plant and environmental data are collected by plant sensing system 616, which sends real-time measurements to dynamic nutrient manager 604. In this way, nutrients can adapt to provide optimal nutrients for each plant system in its unique microenvironment.

Space Optimization

Figure 7:
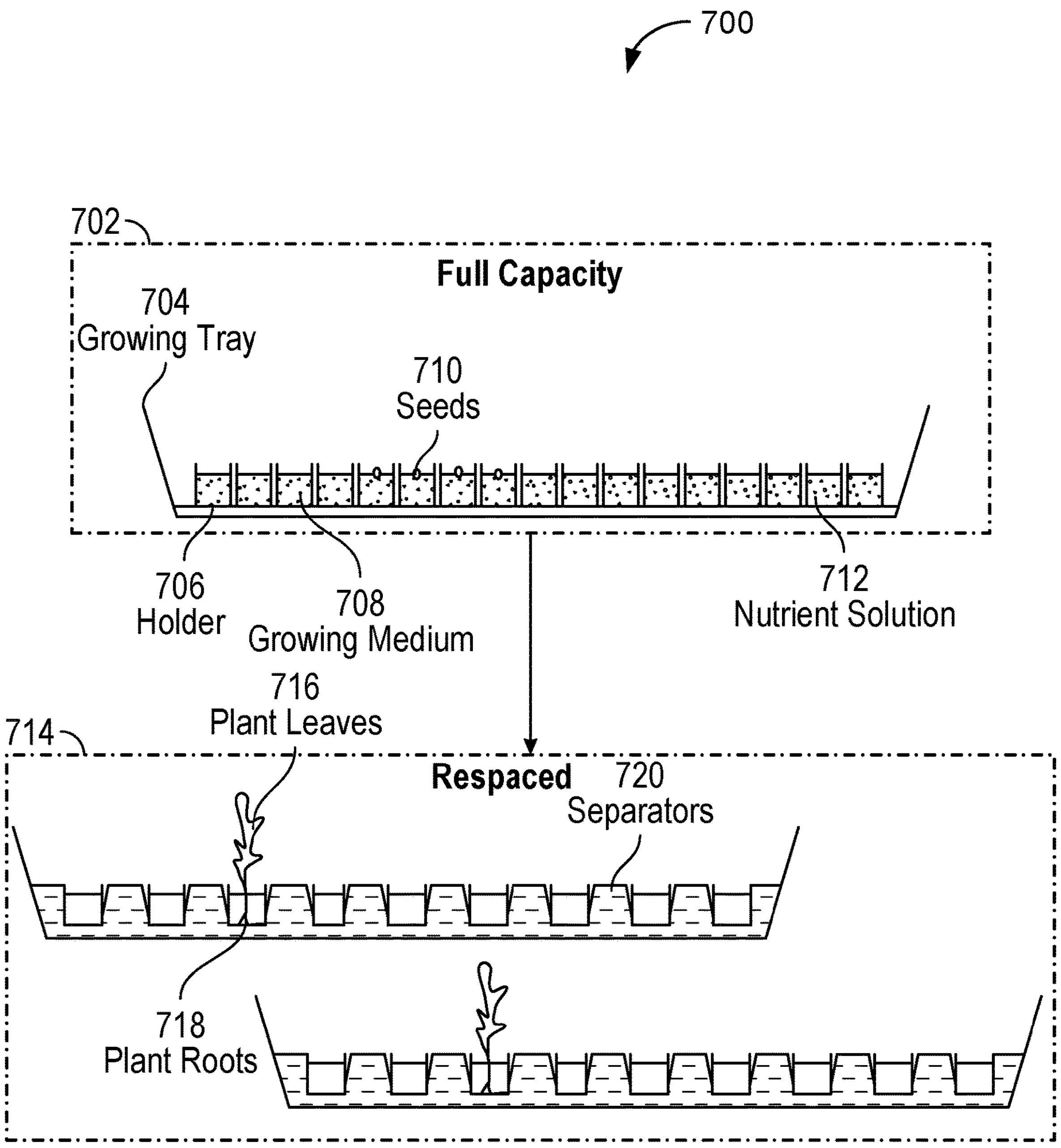
FIG. 7 illustrates a method for space optimization, in accordance with one or more embodiments of the present disclosure.

According to various embodiments, one challenge in growing is optimal space utilization. Ultimately, plants need space to grow, but the space they occupy early in life is a small fraction of their final needs. Methods exist to respace plants, but in traditional non-recirculating systems they are slow and cannot be performed without entering the growth space. FIG. 7 illustrates a method 700 for space optimization. The small-volume one-way flow presented enables transportation of the growth systems to a central location where plant respacing can happen manually and with large pieces of automation. To achieve method 700, plant systems are seeded, germinated, and grown for a short amount of time at full capacity 702. Seeds 710 are seeded in holder 706, which contains growing medium 708 and nutrient solution 712. Once plants need more space, the whole growing tray 704 can be brought in from the growth space to a central location by a robot. The central location makes it possible to use machines larger than those that would have to enter the growth space, thus keeping the growth space as densely packed as possible. When the densely packed growth trays come in, a portion of the holders can be moved to a new growing tray with separators 720, giving the plant leaves 716 and plant roots 718 more space to finish their life cycle and utilize the growing space most efficiently. This respacing step can be repeated as many times as needed to optimize the growing space for the plants.

Accordion Respacing

Figure 8:
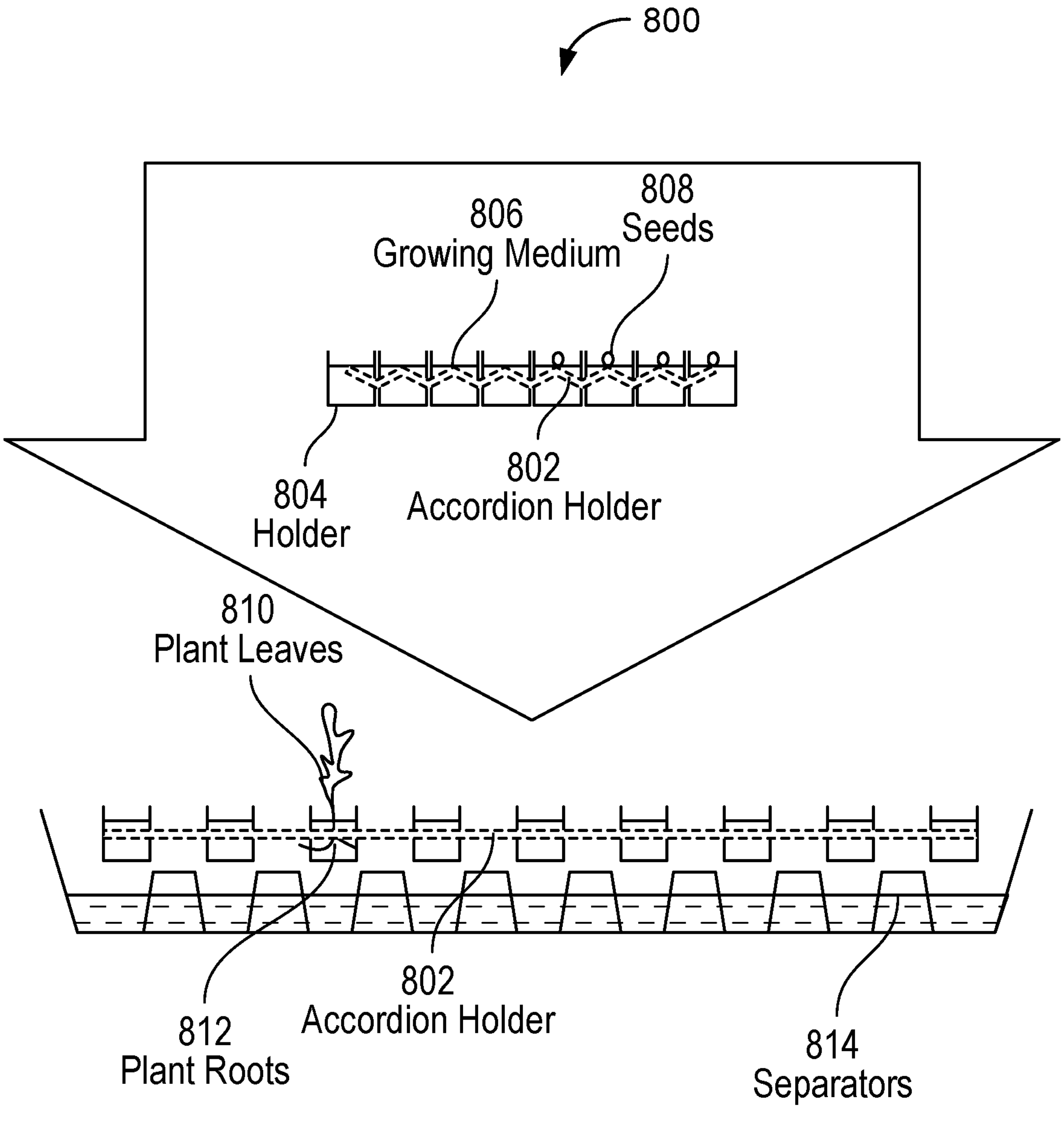
FIG. 8 illustrates a growth system with accordion respacing, in accordance with one or more embodiments of the present disclosure.

According to various embodiments, mechanisms for respacing plants often require handling each plant holder. When respacing an entire growing tray of holders 702, this process can be very labor intensive and can require many parts. FIG. 8 illustrates a growth system 800 with accordion respacing. Growth system 800 implements an accordion holder 802, which allows for respacing using a single unit. Accordion holder 802 can be compressed such that all of the individual plant holders 804 are next to each other in a compressed state. That way, seeds 808 can grow in growing medium 806 in a compact manner. Then, as the plants start to grow, accordion holder 802 can be stretched out, or pulled apart, in order to make space for plant leaves 810 and roots 812. In some embodiments, accordion holder 802 is configured such that it automatically pulls apart as the plants grow. Such embodiments make respacing less labor intensive and even automatable, since the plant holders are all connected.

Root Zone Control

Figure 9:
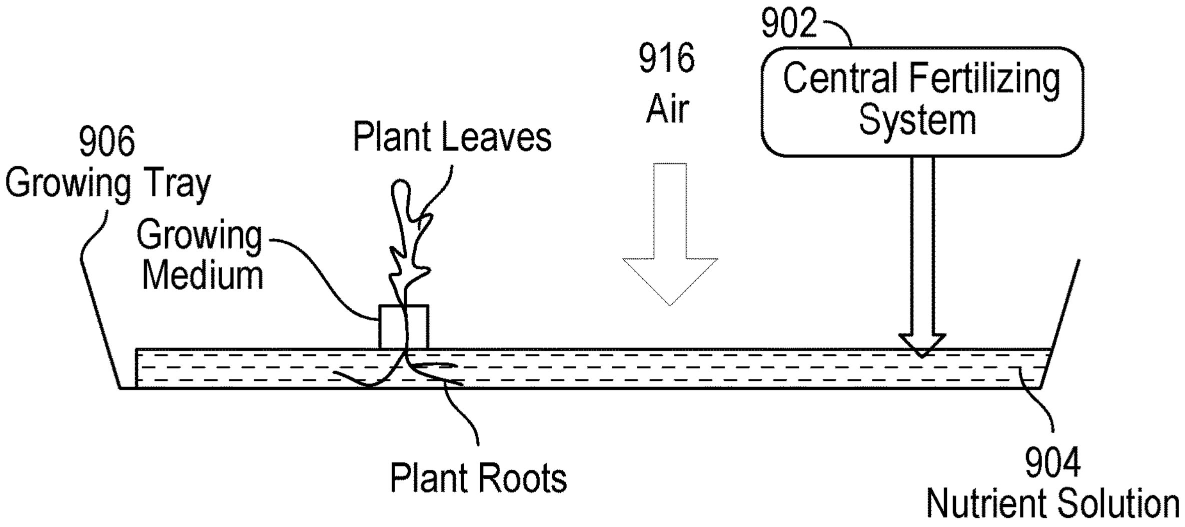
FIG. 9 illustrates a growth system with root zone control, in accordance with one or more embodiments of the present disclosure.

According to various embodiments, the root zone plays an important role in keeping plants healthy. Factors including temperature and dissolved oxygen concentration are often monitored. In traditional recirculating systems, the internal movement of the nutrient solution along with active aeration maintain high dissolved oxygen levels. In the non-recirculating systems, an air gap between the top of the container and the surface nutrient solution can be used to keep the roots well oxygenated. FIG. 9 illustrates a growth system with root zone control. Growth system 900 utilizes low-volume nutrient solution 904 in growing tray 906. The low-volume nature of growth system 900 allows nutrient solution 904 to maintain a large surface area exposed to the air 916 relative to the total volume of nutrient solution 904. This high surface area keeps the nutrient solution well oxygenated. However, when this is not enough, the nutrient deliveries can be further oxygenated at central fertilizing system 902. Similarly, if the temperature of the root zone is too warm, the nutrient deliveries can be prepared with cold water to bring down the temperature in a growing tray. The frequent dynamic deliveries from the central fertilizing system 902 enables precise root zone control.

Robotic Mixing

Figure 10:
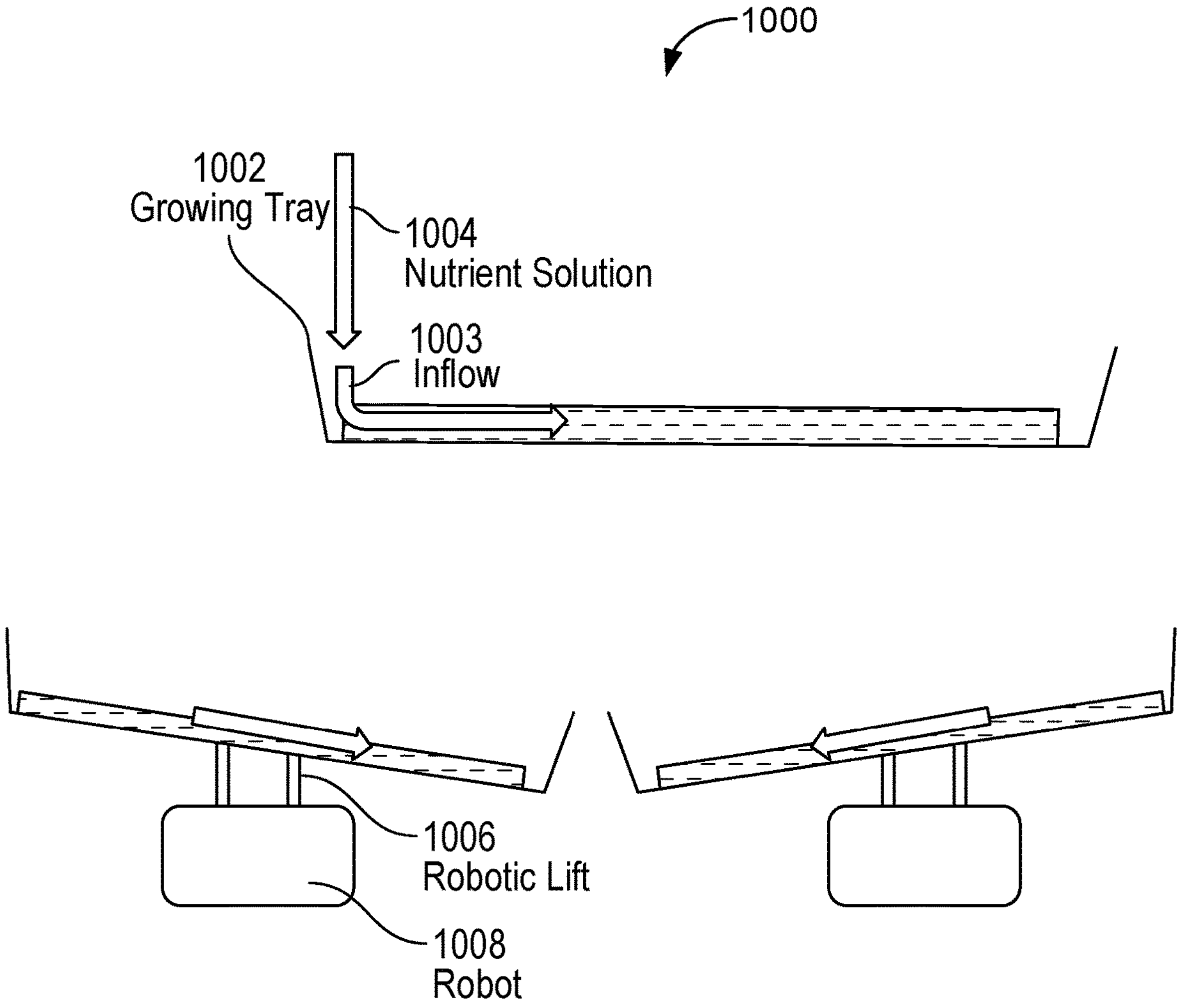
FIG. 10 illustrates a method of robotic mixing, in accordance with one or more embodiments of the present disclosure.

According to various embodiments, even nutrient distribution is important for consistent plant growth. Traditional hydroponic systems rely on nutrient solution circulation and/or mixing via plumbing to promote even nutrient delivery to all plants. Despite this active circulation, nutrient gradients can develop since plants next to the inflow always receive the freshest nutrient solution. FIG. 10 illustrates a method of robotic mixing. Method 1000 is a low-volume, no-flow growth method. First, nutrient solution 1004 is delivered to inflow 1003 of growing tray 1002. While the nutrients will naturally spread via water flow and diffusion, external forces can be applied to growing tray 1002 in order to achieve thorough nutrient mixing within the growing tray. In some embodiments, growing tray 1002 can be physically picked up and tipped back and forth to slosh around nutrient solution 1004. In some embodiments, automation of this tipping can be done via a robot 1008, which extends its robotic lift 1006 to tip the module back and forth. In some embodiments, robots can tip modules immediately after nutrient delivery to ensure even nutrient distribution within the growing tray 1002.

Multi-Side Deliveries

Figure 11:
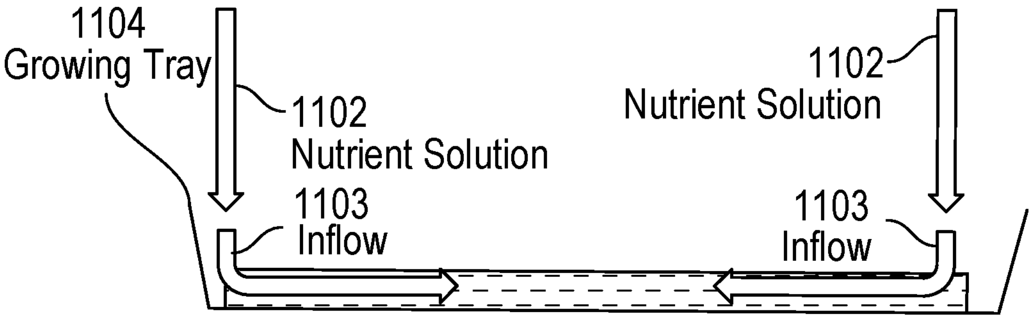
FIG. 11 illustrates a growth system with multi-side deliveries, in accordance with one or more embodiments of the present disclosure.

According to various embodiments, under some growth conditions, the natural mixing and diffusion within the module is not sufficient and a gradient forms with high concentrations of nutrients next to the inflow and low concentrations in the areas farthest away from the inflow. One way to address this gradient is to use robotic mixing, as described above. Another way to prevent this gradient formation is to create multiple inflow sites 1103 for nutrient solution 1102 to flow into growing tray 1104, as shown in FIG. 11. In such embodiments, it is possible to alternate nutrient deliveries between both sides of the module, which ensures fresh nutrient solution in all parts of growing tray 1104. Alternatively, in order to keep growspace densities high, a mobile robot can also lift a growing tray and rotate it in place to change the nutrient solution intake that is accessible for watering without requiring robot access to both nutrient solution intakes at once.

Figure 12:
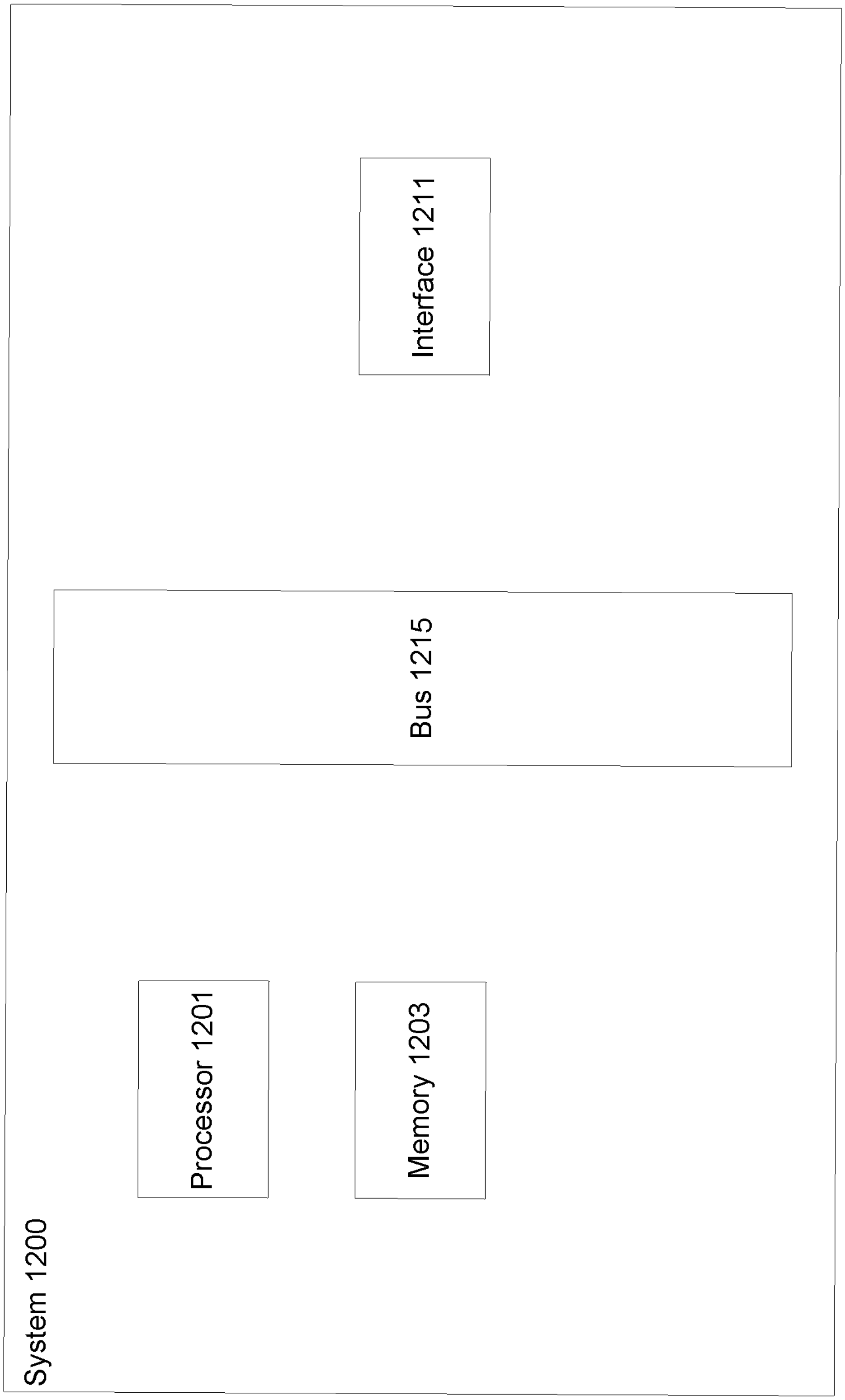
FIG. 12 illustrates an example of a computer system, configured in accordance with one or more embodiments of the present disclosure.

The examples described above present various features that utilize a computer system or a robot that includes a computer. However, embodiments of the present disclosure can include all of, or various combinations of, each of the features described above. FIG. 12 illustrates one example of a computer system, in accordance with embodiments of the present disclosure. According to particular embodiments, a system 1200 suitable for implementing particular embodiments of the present disclosure includes a processor 1201, a memory 1203, an interface 1211, and a bus 1215 (e.g., a PCI bus or other interconnection fabric). When acting under the control of appropriate software or firmware, the processor 1201 is responsible for implementing applications such as an operating system kernel, a containerized storage driver, and one or more applications. Various specially configured devices can also be used in place of a processor 1201 or in addition to processor 1201. The interface 1211 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1200 is a computer system configured to run a control space operating system, as shown herein. In some implementations, one or more of the computer components may be virtualized. For example, a physical server may be configured in a localized or cloud environment. The physical server may implement one or more virtual server environments in which the control space operating system is executed. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A system comprising:

a plurality of plant growth units, wherein a nutrient solution of water and nutrients for each plant growth unit in the plurality of plant growth units is isolated from any other plant growth unit;

a dynamic nutrient manager configured to collect data that includes an independent data set generated for each plant growth unit of the plurality of plant growth units and calculate a customized nutrient plan for each plant growth unit of the plurality of plant growth units based on the independent data set for each respective plant growth unit; and a mobile robot, wherein the mobile robot is configured to:

retrieve from a central fertilizing system, for a plant growth unit, the customized nutrient solution generated based on the independent data set associated with the plant growth unit, transport the customized nutrient solution from the central fertilizing system to the plant growth unit via an onboard fertigation tank; and deliver the customized nutrient solution directly to the plant growth unit from the onboard fertigation tank using a unidirectional, non-recirculating delivery path, wherein the mobile robot is configured to tip the plant growth unit after nutrient delivery to provide even nutrient distribution within the plant growth unit.

2. The system of claim 1, wherein the mobile robot comprises a solution mixing mechanism.

3. The system of claim 1, wherein the mobile robot is configured to lift and rotate a growing tray to change a nutrient solution intake of the plant growth unit that is accessible for delivery.

4. The system of claim 1, wherein each plant growth unit is configured such that plants within the plant growth unit can be respaced during a growth cycle.

5. The system of claim 1, wherein the dynamic nutrient manager is configured to calculate the customized nutrient plan for each plant growth unit based on one or more parameters, the parameters comprising one or more of: plant age, plant variety, plant area, plant height, evapotranspiration prediction, vapor pressure deficit, temperature, light, leaf tissue, or water analysis.

6. The system of claim 1, wherein at least one plant growth unit in the plurality of plant growth units includes an accordion holder.

7. The system of claim 1, further comprising delivering the nutrient solution in a plurality of deliveries in order to perform root zone control.

8. A method of managing a growspace comprising:

arranging a plurality of plant growth units in a grow space, wherein a nutrient solution of water and nutrients for each plant growth unit in the plurality of plant growth units is isolated from any other plant growth unit;

collecting data that includes an independent data set generated for each plant growth unit of the plurality of plant growth units and calculating a customized nutrient plan for each plant growth unit of the plurality of plant growth units based on the independent data set for each respective plant growth unit; and retrieving, by a mobile robot from a central fertilizing system, the customized nutrient solution for a plant growth unit generated based on the independent data set associated with the plant growth unit;

transporting, by the mobile robot, the customized nutrient solution from the central fertilizing system to the plant growth unit via an onboard fertigation tank;

delivering, by the mobile robot, the customized nutrient solution directly to the plant growth unit from the onboard fertigation tank using a unidirectional, non-recirculating delivery path; and mixing the customized nutrient solution within the plant growth unit by tilting, via the mobile robot, the plant growth unit.

9. The method of claim 8, wherein the mobile robot comprises a solution mixing mechanism.

10. The method of claim 8, wherein the mobile robot is configured to lift and rotate a growing tray to change a nutrient solution intake of the plant growth unit that is accessible for delivery.

11. The method of claim 8, wherein each plant growth unit is configured such that plants within the plant growth unit can be respaced during a growth cycle.

12. The method of claim 8, further comprising:

calculating the customized nutrient plan for each plant growth unit based on one or more parameters, the parameters comprising one or more of: plant age, plant variety, plant area, plant height, evapotranspiration prediction, vapor pressure deficit, temperature, light, leaf tissue, or water analysis.

13. The method of claim 8, wherein at least one plant growth unit in the plurality of plant growth units includes an accordion holder.

14. The method of claim 8, further comprising delivering the nutrient solution in a plurality of deliveries in order to perform root zone control.

* * * * *